(12) United States Patent
Unger et al.

(10) Patent No.: US 8,018,750 B2
(45) Date of Patent: *Sep. 13, 2011

(54) POWER CIRCUIT WITH PASSTHROUGH

(75) Inventors: Robert Allan Unger, El Cajon, CA (US); Takaaki Ota, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/849,058

(22) Filed: Aug. 3, 2010

(65) Prior Publication Data

US 2010/0296326 A1 Nov. 25, 2010

Related U.S. Application Data

(63) Continuation of application No. 11/633,790, filed on Dec. 5, 2006, now Pat. No. 7,782,642.

(51) Int. Cl.
*H02M 1/00* (2007.01)
*G05F 5/00* (2006.01)

(52) U.S. Cl. .......................... 363/146; 323/301

(58) Field of Classification Search .................. 363/146, 363/147; 323/301
See application file for complete search history.

(56) References Cited

U.S. PATENT DOCUMENTS

| | | | | | |
|---|---|---|---|---|---|
| 5,563,782 | A | * | 10/1996 | Chen et al. | 363/146 |
| 5,753,979 | A | * | 5/1998 | Lam | 307/28 |
| 5,900,684 | A | * | 5/1999 | Lam | 307/139 |
| 6,061,261 | A | * | 5/2000 | Chen et al. | 363/146 |
| 6,087,818 | A | * | 7/2000 | Hughes | 323/301 |
| 7,019,997 | B2 | * | 3/2006 | Ooishi | 363/146 |
| 7,031,131 | B2 | * | 4/2006 | Kudo et al. | 361/93.1 |
| 7,239,536 | B2 | * | 7/2007 | Wu et al. | 363/146 |
| 7,426,126 | B1 | * | 9/2008 | Lai | 363/146 |
| 7,554,828 | B2 | * | 6/2009 | Wilson | 363/146 |
| 7,782,642 | B2 | * | 8/2010 | Unger et al. | 363/146 |
| 2006/0087872 | A1 | * | 4/2006 | Barsun et al. | 363/146 |

* cited by examiner

*Primary Examiner* — Adolf Berhane
(74) *Attorney, Agent, or Firm* — Miller Patent Services; Jerry A. Miller

(57) ABSTRACT

A power circuit device has a housing. A connection electrically couples AC power to an interior portion of the housing. A female electrical socket is coupled to the housing and is electrically coupled to and receives AC power from the connection. An AC to DC converter is electrically coupled to the connection to receive AC power therefrom and produce a DC output therefrom. A current sensor senses current drawn by one of the AC to DC converter and the female electrical socket. A switch, responsive to the current sensor, selectively removes power from the other one of the female electrical socket and the AC to DC converter when a drop in current is sensed by the current sensor. AC versions without DC conversion are also contemplated. This abstract is not to be considered limiting, since other embodiments may deviate from the features described in this abstract.

26 Claims, 2 Drawing Sheets

POWER CIRCUIT WITH PASSTHROUGH

CROSS REFERENCE TO RELATED DOCUMENTS

This application is a continuation of allowed U.S. patent application Ser. No. 11/633,790 filed Dec. 5, 2006 now U.S. Pat. No. 7,782,642 which is hereby incorporated by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Many consumer electronic products are powered from the AC circuits either directly or via a power converter such as a so called "power brick", "wall wart", etc. As a result, AC outlets can be rapidly consumed, even though total current consumption can remain at safe levels. Additional outlets and or power strips are the usual solution.

When two or more associated devices (i.e., where one serves as an accessory to another), it is often the case that when one device is not on, the other need not be powered. By way of example, an accessory device may remain unnecessarily powered on when the main device is turned off. Using conventional power strips, power is unnecessarily wasted.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
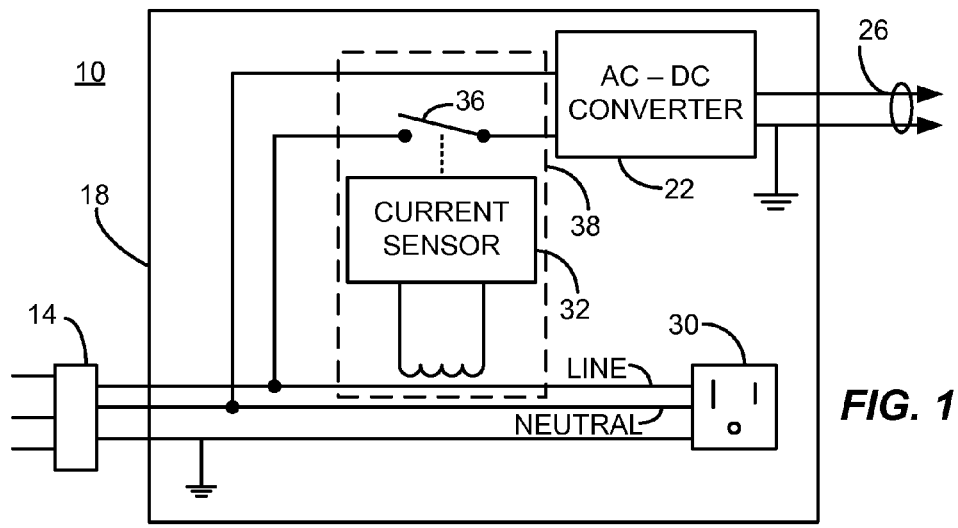
FIG. 1 is a diagram of a power brick device consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The term "power brick" as used herein is to be considered generic for external power supply devices (including, but not limited to, so called "wall warts" and the like), where external is construed to mean external to the device being powered. For purposes of this document, the terms "male" and "female" are to be considered merely to be labels (as are "plug" and "socket" and like designations) that distinguish a mated pair of connectors without regard for the conventionally designated gender of any standard or custom connector without limitation. Hence, the term "male" can be equivalently construed to read upon a connector that is conventionally considered a female connector and the term "female" can be construed to read upon a connector that is conventionally considered a male connector. Likewise, a plug can be considered a socket and a socket can be considered a plug, and all such terms are equivalent to any mated pair of connectors without regard for conventional gender terms used for such connectors. These terms are used in the description and claims that follow in a manner that facilitates understanding of certain preferred embodiments, but are not to be limited by meanings conferred other than by these definitions.

In accordance with certain embodiments consistent with the present invention a conventional power brick is enhanced to include a pass-through via a female electrical socket (directly or via a so-called "pigtail") to supply AC power, so that another piece of equipment can be powered by the power brick while the power brick serves to provide a DC power supply to another device. This is especially useful when the product requiring the power supply is an add-on module or other add-on enhancement to the primary device (e.g., a printer and a computer). This reduces the number of outlets required, reduces cords, reduces cord clutter and reduces power consumption. Power consumption is reduced by virtue of switching off a secondary device automatically when a primary device is turned off and therefore drawing little or no current. (For example, in the case of certain devices such as television sets, when the television set is "off" it is actually in a standby mode to supply a few milliamps of current to a remote control receiver circuit and circuits that provide for "instant on" abilities.)

Turning now to FIG. 1, a power brick 10 consistent with certain embodiments is depicted in which an electrical plug 14 is used to plug the power brick into a conventional electrical outlet. Power brick 10 incorporates a housing 18 into which line level power is passed via a power cord coupled to plug 14 in the embodiment depicted (e.g., a two or three wire standard electrical plug). The power connection may be a two or three wire connection without departing from embodiments consistent with the invention, and the three wire embodiment shown can omit the third wire under certain circumstances, since the ground is redundant to the common or neutral connection in most cases.

Once power has been passed inside housing 18, the power passes to an AC to DC converter 22 which produces an output at 26 in the form of a regulated, pulsed or filtered DC voltage after conversion by a suitable transformer and/or associated circuitry (e.g., a switched power supply or simple rectifier and filter capacitor and/or voltage regulator). In other embodiments, the output may be supplied as AC, as will be shown.

Line power from the plug 14 is further passed along to a female electrical socket connector 30 (in this embodiment shown to be directly connected to the power brick housing 18, but this is not to be limiting). In the present embodiment, the current passing to the female electrical socket 30 is the primary circuit connection, while the output at 26 is considered a secondary output. The current passing to electrical socket 30 is sensed by a current sensor 32 of any suitable design. Current passing to the input of the AC to DC converter 22 is controlled by a switch 36 such that when a drop in current (or absence of current) is detected by current sensor 32, switch 36 is opened. In certain embodiments, the switch 36 and current sensor 32 may comprise, for example, a magnetic mechanical relay switch 38, depicted with a dashed outline within the example of FIG. 1. When current is passing through the female electrical socket 30, the current sensor 32 detects the current flow and closes switch 36 restoring power to the AC to DC converter 22

In this manner, an accessory device powered by the AC to DC converter 22 is disabled when power is turned off to a primary device plugged into female electrical socket 30, thus conserving power. In one illustrative example, the primary device plugged into socket 30 might be a television set, and the accessory device powered by AC to DC converter 22 might be an Internet Television adapter or digital tuner or other auxiliary device. When the television is turned off, power consumption through socket 30 drops (or ceases) below a threshold current that is sensed by the current sensor 32. When this occurs, the power block has determined that the television is off (or in a standby state). In this example, if the television is turned off, there is likely no need to power an Internet TV adapter (presuming, of course, that the Internet TV adapter has no independent function requiring power when the television is powered off), digital television tuner, etc. In this manner power is not needlessly wasted.

Figure 2:
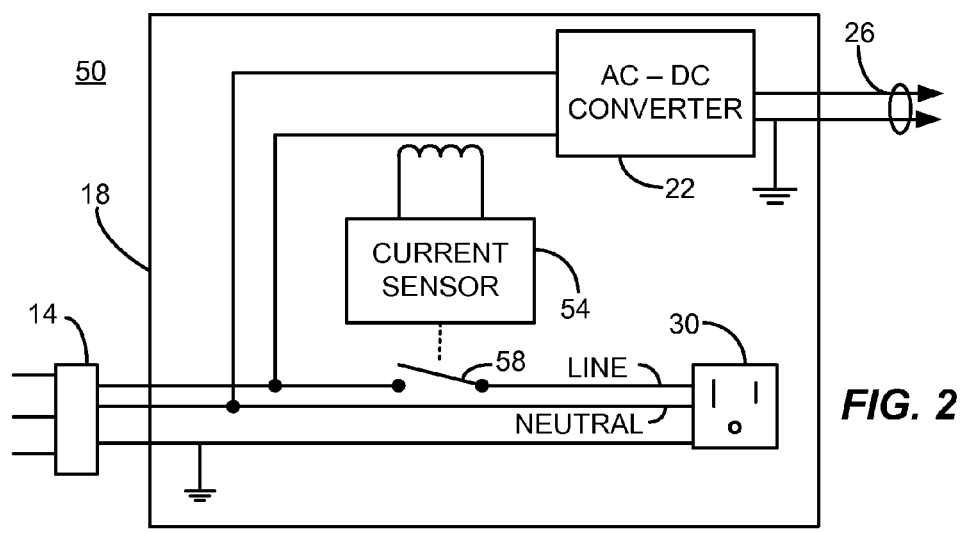
FIG. 2 is a diagram of another power brick device consistent with certain embodiments of the present invention.

An analogous embodiment 50 is depicted in FIG. 2, except that the current sensor and switch functions are reversed so that power drawn by the AC to DC converter 22 is sensed by a current sensor 54—hence, if current drawn by the AC to DC converter ceases or drops below a threshold current, power is disabled to the female electrical socket 30 by switch 58.

In practice, the current sensor 32 in FIG. 1 or 54 in FIG. 2 can be implemented in any number of ways using either semiconductor or mechanical (magnetic relay) switching. As such, the current sensor 32 in combination with the switch 36 may be implemented as a magnetic mechanical relay switch 38, depicted with a dashed outline within the example of FIG. 1, as appropriate for a given implementation. In one case, implementation can be via a semiconductor sensor device powered by DC power. In certain embodiments, this implies that a separate AC to DC converter be implemented as a part of the sensor circuit. In the case where the switch 36 is moved to the DC side of the AC to DC converter 22, the AC to DC converter 22 can itself be used to power the sensor.

While the embodiments shown in FIGS. 1-2 show only switching the line signal either to the socket or the AC to DC converter, both line and neutral signals could be switched, or in the case of power brick 10, power at the output of AC to DC converter could be switched. Similarly, for power brick 50, the current at the output of the AC to DC converter 22 could be sensed rather than the input. It is thus noted that the depicted embodiments show sensing of AC current in order to determine whether to switch. However, sensing DC current at output is equivalent to sensing current at AC to DC converter input, and such embodiments are contemplated hereby.

In one of the simpler embodiments, the current sensors discussed can take the form of a simple AC responsive relay (which may incorporate AC to DC conversion) which, upon sensing a drop in current, causes the relay switch contacts to open. The switch contacts close upon application of suitably high current to the relay. In other embodiments, electronic sensing such as that used in clamp-on current meters or the like may also be used to switch an electronic or mechanical switch or relay. Those skilled in the art will appreciate that the sensor and switch arrangement can be devised by many suitable mechanisms upon consideration of the present teachings.

Figure 3:
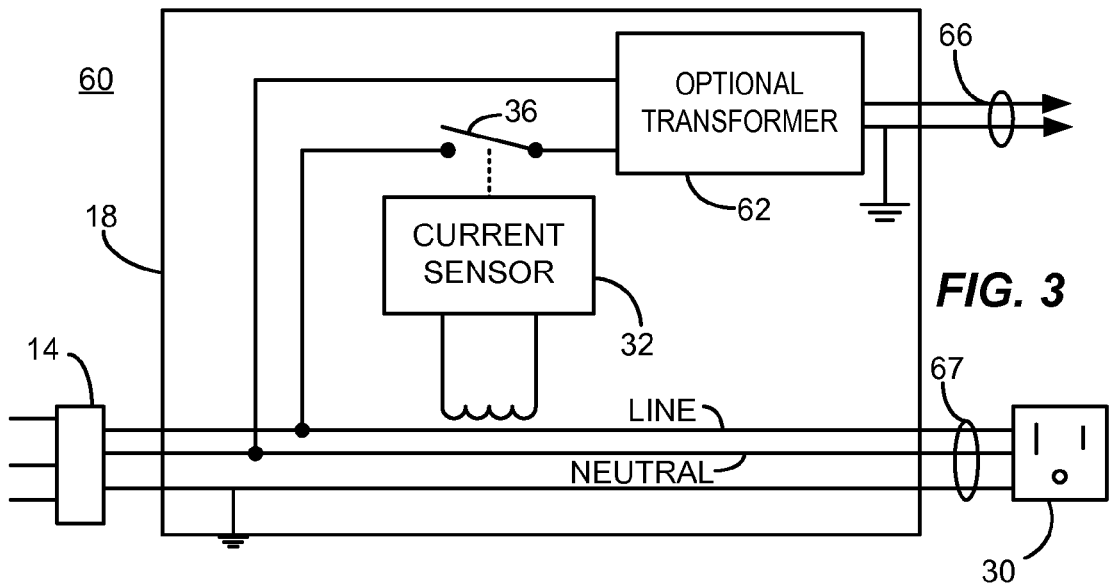
FIG. 3 is a diagram of another power brick device consistent with certain embodiments of the present invention.

In another embodiment, depicted as 60 of FIG. 3, rather than carrying out the switching in an AC to DC power brick, the switching can be carried out in an AC-AC environment—either with or without voltage conversion by use of a transformer such as 62. In this example, AC power is supplied at the output 66. While depicted as a "hot" signal line and ground, the output could equally well be supplied as a three line connection (hot, neutral and ground) or a two wire connection (hot and neutral) without departing from embodiments consistent with the present invention. Either the power consumption by the output 30 can cause switching of the power at 36, or can switch power at the output side of transformer 62 (if present). Although not shown, the output can be via a conventional electrical socket or via a pigtail connection, etc. Also note that in this embodiment, a pigtail connection 67 is depicted between power block housing 18 and electrical connector 30 (in this illustration, a conventional female three prong outlet as is common in the United States. However, other configurations for connections to receive power from either the primary output 30 or the secondary output 66 can be implemented freely without departing from the present invention, including male or female connectors.

Figure 4:
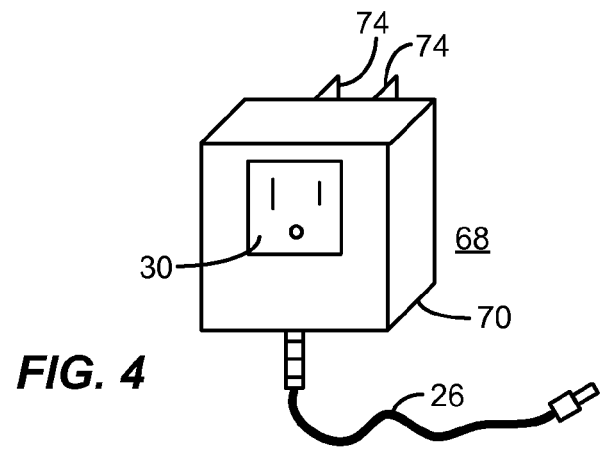
FIG. 4 is a diagram depicting a "wall wart" configuration consistent with certain embodiments of the present invention.

The above embodiments show an external power plug 14, however, a wall wart style embodiment 68 can be devised as depicted in FIG. 4. In this embodiment, a housing 70 incorporates male electrical plug prongs that are equivalent to plug 14 and shown as 74, that are directly attached mechanically to the power brick housing 70. The female electrical socket 30 is shown integral to the housing 70, but could be in the form of a pigtail connection to the power brick 68. Output power from the AC to DC converter 22 can be provided as a pigtail connection as shown as 26, or could be in the form of a female jack that receives a plug, or could be a permanent attachment to the device being powered without limitation. Hence, embodiments may be realized by molding a pass through outlet into a wall wart where the wall wart plugs directly into the wall outlet. Also, the power brick can provide fusing, electric breaker and/or surge filtering functionality to the AC pass through terminal. Additionally, the brick can introduce interactive functionality between DC line and AC pass through line, i.e. current usage of one side to turn on or off the other line as described. Many other variations will occur to those skilled in the art upon consideration of the present teachings.

Thus, a power brick device has a power brick housing. A male electrical plug electrically couples AC power to an interior portion of the power brick housing. A female electrical socket is coupled to the power brick housing and is electrically coupled to and receives AC power from the male electrical plug. An AC to DC converter is electrically coupled to the male electrical plug to receive AC power therefrom and produce a DC output therefrom. A current sensor senses current drawn by one of the AC to DC converter and the female electrical socket. A switch, responsive to the current sensor, selectively removes power from the other one of the female electrical socket and the AC to DC converter when a drop in current (such as an absence of current) is sensed by the current sensor. Many variations are possible in where and how current is sensed and where and how power is switched without departing from embodiments consistent with the present invention. Moreover, many mechanical configurations are possible, including those in which the electrical plug and female electrical socket are directly or indirectly mechanically attached to the housing.

In certain embodiments, the current sensor senses current drawn by the AC to DC converter, while in others, the current sensor senses current drawn through the female electrical connector. The electrical plug may be directly mechanically coupled to the power brick housing in certain embodiments. The female electrical socket is directly mechanically coupled to the power brick housing in certain embodiments. The electrical plug is coupled to the power brick housing via an electrical cord in certain embodiments. The switch comprises a relay switch in certain embodiments. The current sensor senses an absence of current in certain embodiments.

In certain embodiments, a power brick device has a power brick housing. A male electrical plug electrically couples AC power to an interior portion of the power brick housing. A female electrical socket is coupled to the power brick housing, the female electrical socket being electrically coupled to and receives AC power from the male electrical plug. An AC to DC converter is electrically coupled to the male electrical plug to receive AC power therefrom and produce a DC output therefrom. A current sensor senses current drawn by the AC to DC converter; and a switch, responsive to the current sensor, selectively removes power from the female electrical socket when a drop in current is sensed by the current sensor.

In another embodiment, a power brick device has a power brick housing. A male electrical plug electrically couples AC power to an interior portion of the power brick housing. A female electrical socket is coupled to the power brick housing, the female electrical socket being electrically coupled to and receives AC power from the male electrical plug. An AC to DC converter is electrically coupled to the male electrical plug to receive AC power therefrom and produce a DC output therefrom. A current sensor senses current drawn through the female electrical socket. A switch, responsive to the current sensor, selectively removes power from the AC to DC converter when a drop in current is sensed by the current sensor.

In another embodiment, a power brick device has a power brick housing. A male electrical plug electrically couples AC power to an interior portion of the power brick housing, wherein the electrical plug is directly mechanically attached to the power brick housing. A female electrical socket is coupled to the power brick housing, the female electrical socket being electrically coupled to and receives AC power from the male electrical plug, wherein the female electrical socket is directly mechanically coupled to the power brick housing. An AC to DC converter is electrically coupled to the male electrical plug to receive AC power therefrom and produce a DC output therefrom. A current sensor senses current drawn by one of the AC to DC converter and the female electrical socket. A switch, responsive to the current sensor, selectively removes power from the other one of the female electrical socket and the AC to DC converter when a drop in current is sensed by the current sensor.

In certain embodiments, a power brick device has a power brick housing. A male electrical plug electrically couples AC power to an interior portion of the power brick housing. A female electrical socket, coupled to the power brick housing, that is electrically coupled to and receives AC power from the male electrical plug. An AC outlet is coupled to the male electrical plug to receive AC power therefrom and produce an AC output therefrom. A current sensor senses current drawn by the female electrical socket. A switch, responsive to the current sensor, selectively removes power from the AC outlet when a current less than a threshold current is sensed by the current sensor. A transformer may be disposed prior to the AC output to convert the AC voltage to a different value prior to output.

In certain embodiments, a power brick device has a power brick housing. A male electrical plug electrically couples AC power to an interior portion of the power brick housing. A primary electrical output receives AC power from the male electrical plug. A secondary electrical output is coupled to the male electrical plug to receive AC power therefrom and produce an AC output therefrom. A current sensor senses current drawn by the primary electrical output. A switch, responsive to the current sensor, selectively removes power from the secondary electrical outlet when a current less than a threshold current is sensed by the current sensor. A transformer may be disposed prior to the AC output to convert the AC voltage to a different value prior to output.

While certain illustrative embodiments have been described, it is evident that many alternatives, modifications, permutations and variations will become apparent to those skilled in the art in light of the foregoing description.

What is claimed is:

1. A power circuit device, comprising:
a housing;
a connection that electrically couples AC power to an interior portion of the housing;
a female electrical socket, coupled to the housing, said female electrical socket being electrically coupled to and receives AC power from the connection that couples AC power to the housing;
an AC to DC converter electrically coupled to the connection that couples AC power to the housing to receive AC power therefrom and produce a DC output therefrom;
a current sensor that senses current drawn by one of the AC to DC converter and the female electrical socket; and
a switch, responsive to the current sensor, that selectively removes power from the other one of the female electrical socket and the AC to DC converter when a current less than a threshold current is sensed by the current sensor.

2. The power circuit device according to claim 1, where the housing comprises a power brick housing.

3. The power circuit device according to claim 1, where the connection comprises a male electrical plug.

4. The power circuit device according to claim 1, wherein the current sensor senses current drawn by the AC to DC converter.

5. The power circuit device according to claim 1, wherein the current sensor senses current drawn through the female electrical socket.

6. The power circuit according to claim 1, wherein the electrical plug is directly mechanically coupled to the housing.

7. The power circuit device according to claim 1, wherein the female electrical plug is directly mechanically coupled to the housing.

8. The power circuit device according to claim 1, wherein the switch comprises a relay switch.

9. The power circuit device according to claim 1, wherein the current sensor senses an absence of current.

10. A power circuit device, comprising:
- a housing;
- a connection that electrically couples AC power to an interior portion of the power brick housing;
- a female electrical socket, coupled to the power brick housing, said female electrical socket being electrically coupled to and receives AC power from the connection;
- an AC to DC converter electrically coupled to the connection to receive AC power therefrom and produce a DC output therefrom;
- a current sensor that senses current drawn by the AC to DC converter; and
- a switch, responsive to the current sensor, that selectively removes power from the female electrical socket when a drop in current is sensed by the current sensor.

11. The power circuit device according to claim 10, wherein the electrical plug is directly mechanically coupled to the housing.

12. The power circuit device according to claim 10, wherein the female electrical socket is directly mechanically coupled to the housing.

13. The power circuit device according to claim 10, wherein an electrical plug is coupled to the housing via an electrical cord.

14. The power circuit device according to claim 10, wherein the switch comprises a relay switch.

15. A power circuit device, comprising:
- a housing;
- a connection that electrically couples AC power to an interior portion of the housing;
- a female electrical socket, coupled to the housing, said female electrical socket being electrically coupled to and receives AC power from the connection;
- an AC to DC converter electrically coupled to the connection to receive AC power therefrom and produce a DC output therefrom;
- a current sensor that senses current drawn through the female electrical socket; and
- a switch, responsive to the current sensor, that selectively removes power from the AC to DC converter when a drop in current is sensed by the current sensor.

16. The power circuit device according to claim 15, wherein the current sensor senses current drawn by the AC to DC converter.

17. The power circuit device according to claim 15, wherein the current sensor senses current drawn through the female electrical connector.

18. The power circuit device according to claim 15, wherein the female electrical plug is directly mechanically coupled to the housing.

19. The power circuit device according to claim 15, wherein an electrical plug is coupled to the housing via an electrical cord.

20. The power circuit device according to claim 15, wherein the switch comprises a relay switch.

21. A power circuit device, comprising:
- a housing;
- a connection that electrically couples AC power to an interior portion of the housing, wherein the connection is directly mechanically attached to the housing;
- a female electrical socket, coupled to the housing, said female electrical socket being electrically coupled to and receives AC power from the connection, wherein the female electrical plug is directly mechanically coupled to the housing;
- an AC to DC converter electrically coupled to the connection to receive AC power therefrom and produce a DC output therefrom;
- a current sensor that senses current drawn by one of the AC to DC converter and the female electrical socket; and
- a switch, responsive to the current sensor, that selectively removes power from the other one of the female electrical socket and the AC to DC converter when a drop in current is sensed by the current sensor.

22. The power circuit device according to claim 21, wherein the current sensor senses AC current, and wherein the switch comprises a relay switch.

23. A power circuit device, comprising:
- a housing;
- a connection that electrically couples AC power to an interior portion of the housing;
- a primary electrical output that receives AC power from the connection;
- a secondary electrical output coupled to the connection to receive AC power therefrom and produce an AC output therefrom;
- a current sensor that senses current drawn by the primary electrical output; and
- a switch, responsive to the current sensor, that selectively removes power from the secondary electrical outlet when a current less than a threshold current is sensed by the current sensor.

24. The power circuit device according to claim 23, wherein the secondary electrical outlet is directly mechanically coupled to the housing.

25. The power circuit device according to claim 23, wherein the switch comprises a relay switch.

26. The power circuit device according to claim 23, further comprising a transformer that changes the value of the AC voltage supplied to the secondary AC outlet.

* * * * *